United States Patent [19]

Drake et al.

[11] 4,364,015

[45] Dec. 14, 1982

[54] COMPACT RESERVOIR SYSTEM FOR DYE LASERS

[75] Inventors: J. Michael Drake, Richland, Wash.; Horace W. Furumoto, Wellesley, Mass.

[73] Assignee: Jersey Nuclear-Avco Isotopes, Inc., Bellevue, Wash.

[21] Appl. No.: 243,200

[22] Filed: Mar. 12, 1981

[51] Int. Cl.³ .............................................. H01S 3/05
[52] U.S. Cl. ...................................... 372/53; 210/652; 210/195.2; 210/257.2; 210/321.1; 210/433.2; 210/168
[58] Field of Search ...................... 210/652, 653, 257.2, 210/321.1, 433.2, 805, 195.2, 168; 331/94.5 L

[56] References Cited

U.S. PATENT DOCUMENTS

| 3,740,665 | 6/1973 | Itzkan | 331/94.5 L |
| 3,766,489 | 10/1973 | Rosenberg et al. | 331/94.5 L |
| 3,805,187 | 4/1974 | Lempicki et al. | 331/94.5 |
| 3,868,591 | 2/1975 | Mumola et al. | 331/94.5 L |
| 3,913,033 | 10/1975 | Tuccio et al. | 331/94.5 L |
| 4,176,324 | 11/1979 | Aldag et al. | 331/94.5 L |
| 4,197,512 | 4/1980 | Brenac | 331/94.5 P |

OTHER PUBLICATIONS

Watson, W. et al., "A Circulating-Liquid Laser System", Journal of Quantum Electronics; pp. 842-849, Nov. 1968.

Mostovnikov, V. A. et al., "Recovery of Lasing Properties of Dye Solutions After Their Photolysis", Sov. J. Quantum Electron., vol. 6, No. 9, Sep. 1976.

Primary Examiner—Benoit Castel
Attorney, Agent, or Firm—Weingarten, Schurgin & Gagnebin

[57] ABSTRACT

A dye solution reservoir system for a dye laser comprises a dye solution reservoir, main fluid circuit means for circulating dye solution between the reservoir and a dye laser, and a by-pass dye replenishment loop between the reservoir and the laser for (1) diverting a portion of the solution from the main circuit, (2) filtering substantially all solute, including the dye and other particles from that portion of the solution, (3) replenishing the solution by adding fresh dye solute, and (4) returning the replenished solution to the main circuit. In a preferred embodiment, the solution is filtered by a first filter for removing the dye solute and a second filter for removing degradation by-products and particulate matter. Reverse osmosis may be advantageously used as a part of this filtrate system. The advantage of such systems is a substantial reduction in the required reservoir capacity and enhanced dye recoverability.

13 Claims, 1 Drawing Figure

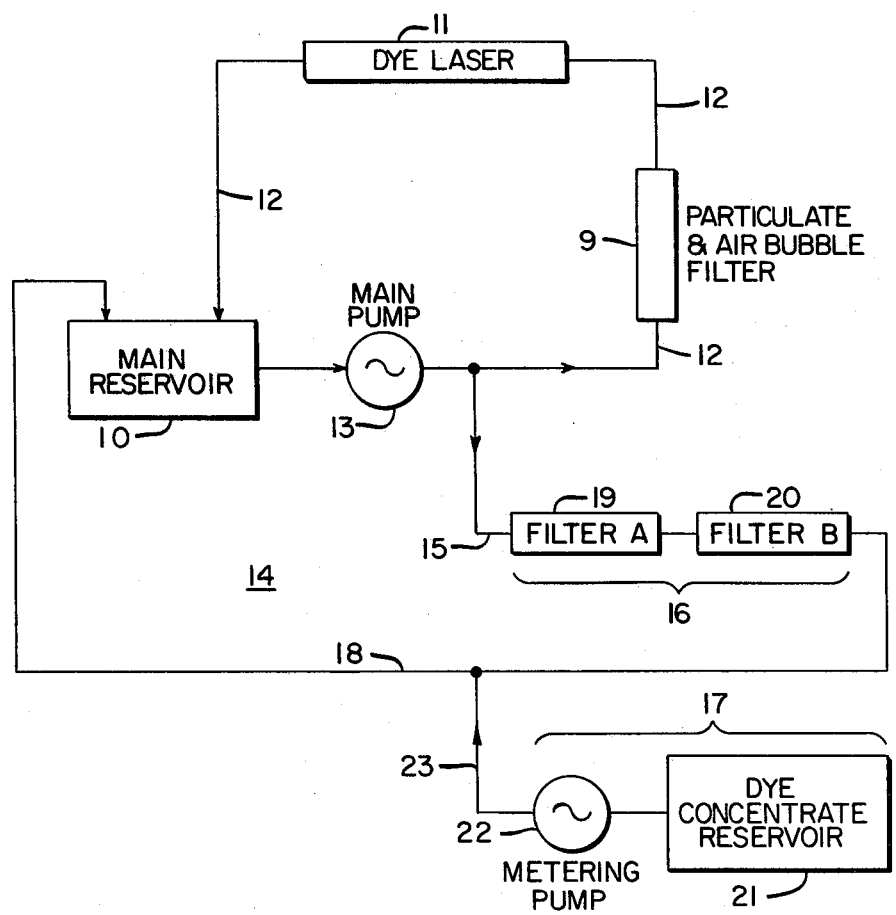

COMPACT RESERVOIR SYSTEM FOR DYE LASERS

FIELD OF THE INVENTION

This invention relates to reservoir systems for liquid dye lasers. More specifically, it relates to a dye solution reservoir system including a by-pass dye replenishment loop for diverting a portion of the dye solution, filtering substantially all solute and replenishing the solution by adding fresh dye.

BACKGROUND OF THE INVENTION

Liquid dye lasers offer considerable promise for many applications, including isotope separation, photochemistry, pollution detection and spectroscopy. Dye lasers differ from the more familiar gas and solid state lasers primarily in that they employ, as an active medium, a fluid dye solution. The dye solution comprises a solvent such as an organic solvent and/or water and a solute of an organic dye material. Typical dyes have a molecular weight in the range between 200 and 1000 and are used in concentrations on the order of $10^{-4}$ moles per liter. A primary advantage of dye lasers over conventional gas and solid state lasers is that the dye laser output can be tuned over a broad range from the near ultraviolet to the near infrared.

Dye reservoir systems are required with liquid dye lasers in order to continuously provide the laser with replenished dye solution. Radiation from the laser excitation source decomposes both the solvent and the solute of the solution, producing by-products which degrade the laser performance. Specifically, the by-products, which typically have molecular weights in excess of about 100, degrade the laser performance by (1) absorbing laser light, (2) quenching excited states, and (3) absorbing excitation light. In order to avoid such degradation, the laser is provided with a reservoir of dye solution, and fresh dye solution is continuously pumped through the laser cavity. The exposed solution is filtered to selectively remove by-products, and it is then returned to the reservoir. Such filtration systems must distinguish between dye molecules and other contaminates, removing the latter but retaining the former in the solution flow system. Any loss of dye is thus to be avoided since the system is provided with only a specific amount of dye at a predetermined concentration.

The difficulty with typical prior art reservoir systems, however, is that they require large reservoirs of dye solution. In many applications, such as in portable systems, space and weight are at a premium. However, conventional dye solution reservoirs, which can require a capacity of ten gallons or more, are the most voluminous part of the dye laser system. Accordingly, there is a need for a more compact reservoir system.

SUMMARY OF THE INVENTION

In accordance with the teaching of the present invention, a filtration system is provided for purifying the fluent lasing material such as a dye solute in a water or organic solvent, in a dye laser circulating loop in which a by-pass loop (1) separates from the main circulation loop a fraction of the fluent material, (2) substantially purifies the solvent by removing all contaminants along with the dye solute to leave relatively pure solvent, and (3) restores the dye concentration level from a dye concentrate source before return of the purified solvent and dye to the main dye laser fluid circulating system.

By thus continuously purifying a small portion of the fluent material an acceptable level of purity can be continuously maintained within the dye laser circulation system. Because the solvent comprises the overwhelming bulk of the laser fluent material, by retaining the solvent through purification and rejecting the dye and other contaminants as waste material, greater efficiency can be achieved along with a substantial reduction in the bulk of the filtration system. Because of the continuous diversion of the small portion of the fluent material for continuous purification, the reservoir capacity can be substantially reduced with the same level of purity of fluent material applied to the laser. It is also preferable that the main laser fluid circulating system include its own filter for removing contaminants without removal of dye molecules to provide optimal purity of the dye and solvent applied to the laser head.

BRIEF DESCRIPTION OF THE DRAWING

The nature, advantages and various features of the invention will appear more fully upon consideration of the illustrative embodiments now to be described in detail in connection with the accompanying drawing. The drawing is a schematic diagram of a preferred dye laser reservoir system in accordance with the invention.

DETAILED DESCRIPTION OF THE PREFERRED EMBODIMENT

The present invention contemplates a material-efficient and space-minimized filtration system for dye laser fluid which comprises a continuous purification loop for fluent material acting as a by-pass of a small portion of the fluent material in the main circulating loop supplying the dye laser head. In particular, the by-pass filtration acts by removal of all solvent components to produce substantially pure solvent to which a metered amount of dye concentrate is restored to establish the operating dye concentration in the by-passed material after which it is restored to the main fluid circulating loop.

The drawing illustrates such a dye laser system wherein a dye solution reservoir 10 is coupled to a dye laser 11 and in particular the flow channel of the laser head, by main fluid circuit means such as tubing 12 and a pump 13 for circulating dye solution through the tubing between the reservoir and the laser. A filter 9 is preferably included to remove large degradation particles and air bubbles.

In accordance with the invention, a by-pass dye replenishment loop 14 is coupled to the main circuit between the reservoir and the laser for diverting, filtering and replenishing a portion of the solution from the main circuit. Specifically, the preferred by-pass loop comprises tubing 15 coupled to the main circuit, preferably following the pump 13 outlet, for diverting a portion of the solution—typically, but not critically, 10%—from the main fluid circuit. Filter arrangement 16 is provided in the loop circuit for filtering substantially all solute and particles from the solution and dye addition means 17 is provided for replenishing the solution by adding fresh dye to the filtered solvent. The tubing 18 then returns the replenish dye solution to the main circuit, preferably to reservoir 10.

The filter arrangement 16 can be comprised of, for example, reverse osmosis membranes, activated charcoal bed filters, silica gel filters or molecular filters. The function of the filter, in contrast with conventional arrangements which selectively remove only the by-products, is to remove substantially all solute including the dye from the solution. In addition, a preferred filter arrangement is constructed to provide a sufficient throughput that the makeup rate of the replenished solution balances the rate of solution degradation in the laser at a desired purity of solution applied to the laser head.

The preferred filter arrangement comprises a pair of filters 19 and 20. The first filter 19 is preferably a filter, such as a charcoal bed filter, for selectively removing the dye solute, and the second filter 20 is preferably a molecular filter, such as a reverse osmosis filter, for removing contaminates such as degradation by-products. In addition, filter 20 will stop all particulates that might be introduced by the charcoal filter. The primary advantage of this filter arrangement is that the solvent, forming the majority of the fluid material bulk is salvaged while the dye is collected separately from the degradation by-products, thereby facilitating dye recovery.

The preferred dye addition means 17 comprises a dye reservoir 21 for containing a quantity of dye concentrate and a metering pump 22, both connected to the feedback loop through tubing to add fresh dye to the filtered solvent at a preselected rate to provide a freshened dye solution at the desired concentration for lasing.

Because the dye is concentrate reservoir 21 can be highly concentrated, typically by two orders of magnitude as compared to the solution concentration of typically $10^{-4}$ moles per liter, the dye concentrate reservoir 21 can be very small in volume as compared to the dye solution reservoir 10.

Because the solvent in this system is continuously separated and completely purified in the by-pass loop, the amount of solvent required for operation is small as compared to that required for unby-passed systems. Accordingly, the size of the dye solution reservoir can be substantially reduced with substantial savings of space and weight. As compared with a conventional portable dye laser system using a ten gallon reservoir, a comparable system in accordance with the invention requires only a one gallon reservoir.

Additional advantages include reduced operating cost due to reduced solvent consumption, reduced problems with solvent waste disposal, and ease of dye recovery.

As an illustrative specific embodiment of the invention, the following specific components can be used to form a system in accordance with the invention:

| Component | Description |
| --- | --- |
| Dye | Rhodamine 6G |
| Solvent | Water/Methanol |
| Dye solution concentration | $1 \times 10^{-4}$M |
| Filter 9 | Polypropylene, 0.25 micron nominal |
| Dye solution reservoir 10 | Stainless steel, 1-5 gallons |
| Tubing 12 | Stainless steel (e.g. 304) |
| Pump 13 | Stainless steel centrifugal pump |
| Dye laser 13 | Flashlamp pumped |
| By-pass loop tubing 15 and 23 | Stainless steel |
| Percent diversion | 1% of pump 13 flow rate |
| Dye filter 19 | Reverse osmosis |
| By-products filter 20 | Molecular sieves |
| Dye reservoir 21 | 0.1–0.5 gallons |
| Metering pump 22 | Positive displacement |
| Dye concentrate | $5 \times 10^{-3}$M – $1 \times 10^{-2}$M |
| Metering rate | 0.1% of pump 13 flow rate |

All wetted parts can be stainless steel (e.g. 304) or any other noncontaminating material compatible with the overall design and safety requirements of the system (e.g. polypropylene or teflon).

While the invention has been described in connection with but one specific example, it is to be understood that this is merely illustrative of many other specific embodiments which can also utilize the principles of the invention. Thus numerous and varied devices can be made by those skilled in the art without departing from the spirit and scope of the invention.

What is claimed is:

1. In a reservoir system for liquid dye lasers of the type comprising a dye solution reservoir and main fluid circuit means for circulating dye solution between the reservoir and a dye laser, the improvement comprising:
a by-pass loop circuit coupled to said main fluid circuit means for diverting therefrom a portion of said solution, said by-pass circuit including filtering means for filtering substantially all solute and particles from said portion of the solution, means for replenishing dye to said portion of the solution, and means for returning said replenished dye solution to said main circuit.

2. An improved reservoir system according to claim 1 wherein said filtering means comprises first filtering means for selectively removing said dye solute from said solution portion and second filter means for removing by-products of laser excitation from said solution portion.

3. An improved reservoir system according to claim 2 wherein said first filter means for removing dye solute comprises charcoal bed filter means.

4. An improved reservoir system according to claim 2 wherein said second filter means for removing by-products of laser excitation comprises a molecular filter.

5. An improved reservoir system according to claim 2 or 3 wherein said second filter means comprises reverse osmosis filter means.

6. An improved reservoir system according to claim 1 wherein said dye laser generates impurities to said solution at a degradation rate, and wherein said filtering means is adapted to; provide a sufficient throughput that the returned replenished dye solution balances the rate of solution degradation at a desired purity of solution in said main fluid circuit.

7. A method for replenishing dye solution in a liquid dye laser system of the type comprising a dye solution reservoir and main fluid circuit means for circulating dye solution between said reservoir and said laser, said method comprising the steps of:
diverting a portion of said dye solution from said main fluid circuit;
filtering substantially all solute and particles from said portion of said dye solution;
replenishing dye to said dye solution portion as filtered; and
returning the replenished dye solution to said main fluid circuit.

8. The method of claim 7 wherein said filtering of substantially all solute from said solution portion comprises filtering dye solute from said solution portion.

9. A purification system for a dye laser comprising:
a dye laser;
a fluid reservoir having dye solution therein at a selected dye concentration including a main fluid circuit fluidly connected to said reservoir for circulating dye solution through said dye laser from said reservoir; and
a bypass filtration circuit receiving a portion of the dye solution in said main circuit, means for filtering said solution portion, means for restoring the selected dye concentration therein and means for returning the restored solution portion to said main fluid circuit.

10. The purification system of claim 9 wherein said filtration circuit includes reverse osmosis filtration means.

11. The purification system of claim 9 or 10 wherein said filtration circuit includes filter means for removing dye solute and filter means for removing contaminants.

12. The purification system of claim 9 further including filter means in said main fluid circuit.

13. The purification system of claim 9 or 12 wherein said filtering means of the bypass filtration circuit is adapted to provide a filtration rate that maintains a desired purity level in the dye solution of said main fluid circuit.

* * * * *